United States Patent [19]

Maitani

[11] 4,137,539

[45] Jan. 30, 1979

[54] SINGLE LENS REFLEX CAMERA

[75] Inventor: Yoshihisa Maitani, Tokyo, Japan

[73] Assignee: Olympus Optical Co., Ltd., Japan

[21] Appl. No.: 726,029

[22] Filed: Sep. 23, 1976

Related U.S. Application Data

[63] Continuation of Ser. No. 329,110, Feb. 2, 1973, abandoned.

[30] Foreign Application Priority Data

May 22, 1972 [JP] Japan .................................. 47-50582
May 22, 1972 [JP] Japan .................................. 47-50583

[51] Int. Cl.² .......................... G03B 9/34; G03B 9/62; G03B 19/12
[52] U.S. Cl. .................................. 354/152; 354/234; 354/243
[58] Field of Search ............... 354/152, 153, 154, 155, 354/156, 242, 243, 244, 241, 226, 234, 60

[56] References Cited

U.S. PATENT DOCUMENTS

| | | | |
|---|---|---|---|
| 2,512,815 | 6/1950 | Svenson | 354/284 |
| 2,608,922 | 9/1952 | Studdert | 354/153 |
| 3,083,627 | 4/1963 | Naumann et al. | 354/136 |
| 3,133,486 | 5/1964 | Maurer | 354/234 |
| 3,185,058 | 5/1965 | Singer | 354/153 |
| 3,608,460 | 8/1971 | Shimomura | 354/60 |
| 3,687,026 | 8/1972 | Kobayashi et al. | 354/60 X |
| 3,688,674 | 9/1972 | Kuramoto | 354/234 |
| 3,739,704 | 6/1973 | Akiyama | 354/243 |
| 3,744,392 | 7/1973 | Dahlgren et al. | 354/243 X |

OTHER PUBLICATIONS

Bouhot, Canon FTQL Phot Argus Test, Supplemental to Phot Argus No. 30, 1970.
Bouhot, Pentax Spotmatic Phot Argus Test Supplement to Phot Argus No. 28, Oct. 1969.
Alien Property Custodian, Ser. No. 402,643, Wagner, May 4, 1973.

*Primary Examiner*—Donald A. Griffin
*Attorney, Agent, or Firm*—Richard J. Birch

[57] ABSTRACT

A single lens reflex camera of compact construction provided with high and low speed controlling mechanisms for a shutter blind wherein the high speed controlling mechanism is received in a space defined by the bottom end of the winding shaft of the shutter, the base of a reflector body and the bottom wall of the camera body.

20 Claims, 5 Drawing Figures

SINGLE LENS REFLEX CAMERA

This is a continuation, of application Ser. No. 329,110 filed Feb. 2, 1973, now abandoned.

BACKGROUND OF THE INVENTION

This invention relates to a single lens reflex camera and more particularly to a camera provided with a high speed controlling mechanism for a shutter blind.

A single lens reflex camera known to date is a type attaining focal alignment while visually observing through a finder an image exactly identical with the one being cast on the exposed portion of a photographic film. The conventional single lens reflex camera comprises a shutter blind positioned immediately ahead of an exposure surface; and an optical system consisting of a movable reflector or a fixed semireflector inclined 45° to the axis of an incident light so as to reflect a light beam passing through an object lens 90° upward from said reflector and a pentaprism for conducting the reflected light to a finder. Among cameras of such type, a 35mm single lens reflex camera using a 35mm film is particularly demanded to be as compact as possible and have a smart appearance. Since, however, the aforesaid optical system is used and moreover a film is inserted in a patrone (cartridge), a single lens reflex camera requires a relatively elongate space for the fitting of said patrone, and has its shape naturally expanded, failing to meet the above-mentioned demands.

To describe in further detail, the body of a single lens reflex camera has a movable reflector located at the center in an inclined state. Ahead of the reflector is positioned an object lens and above said reflector is disposed a pentaprism. Behind the reflector is to be disposed an exposure window. On opposite sides of the reflector immediately behind said exposure window are provided a winding shaft and a rewinding shaft for shifting a shutter blind. On the other side of the blind winding and rewinding shafts are provided spaces in which to receive a patrone and a spool respectively so as to allow a photographic film to pass behind the shutter blind. If an attempt is made linearly to arrange the above-mentioned components in the required positions to render a camera body compact without leaving any unnecessary space, then said body will unavoidably have a laterally elongate box shape.

Further, such laterally elongate box-shaped camera body would have to contain the operating and speed controlling mechanisms of a shutter blind, the winding and rewinding mechanisms of a loaded photographic film, a reflector-operating mechanism and further, where an exposure meter is to be used, said meter and an exposure-indicating mechanism. All these components should be disposed near the associated parts not only for miniaturization of a camera body but also for elimination of operating errors. Therefore, according to the prior art single lens reflex camera, the camera top of the camera body contains the operating and speed controlling mechanisms of a shutter blind (said speed controlling mechanism is only associated with the control of the high operating speed of the shutter blind; a mechanism for controlling the low operating speed of the shutter blind requires a separate governor and is positioned at the bottom of the camera body), winding and rewinding mechanisms of a loaded photographic film, an exposure meter and an exposure-indicating mechanism. According to the arrangement on the camera top of the conventional single lens reflex camera, a shutter blind operating mechanism and a mechanism for controlling the high operating speed of the shutter blind are located above the shutter or blind winding shaft; a film winding mechanism above the film winding shaft; and a film rewinding mechanism above the patrone.

A support panel constituting the base of the camera top has a greater height on the patrone side than on the spool side. The reason is that the patrone received in the camera body has an appreciably greater height than 35mm film wound inside of the patrone and said support panel is only required to have a just sufficient height to receive the film.

A mechanism for controlling the operating speed of the shutter blind of a single lens reflex camera constructed as described above consists of a high speed controlling unit and a low speed controlling unit. The former unit is designed to control the higher operating speed of the shutter blind (expressed in a fraction of a second) than that handled by the latter. With a single lens reflex camera, the operating speed of the shutter blind expressed in seconds is separated into two divisions with a time of 1/60 second taken as a border. An operating speed requiring a shorter period than said border time is designated as high and that taking a longer period is treated as low. The high speed controlling mechanism handles a fraction of a second consisting of more decimal places than that handled by the low speed controlling mechanism and consequently is demanded to measure time with an extremely high degree of precision. If, therefore, the high speed controlling mechanism is placed remote from the shutter release shaft, then there will arise extremely undesirable drawbacks that a mechanism for coupling the high speed controlling mechanism with the shutter release shaft will be of complicated arrangement; a larger number of parts will have to be used, possibly leading to operational error; and such complicated coupling arrangement will unavoidably apply a load increased by that extent to high speed operating parts which should be made as light as possible in order to complete movement from the rest position quickly, for example, in two or three-thousandths of a second; and the increased overall weight of said high speed operating parts will lead to a greater inertia thereof, with the resultant failure to effect the aforementioned instantaneous action. To avoid the above-mentioned difficulties, the prior art single lens reflex camera is so designed that the high speed controlling mechanism of the shutter blind is fully separated from the low speed controlling mechanism thereof; namely, the former unit is positioned near a shutter speed setting dial or above the shutter release shaft and the latter is disposed below said shutter release shaft. Placement of the high speed controlling mechanism and the shutter operating mechanism above the shutter release shaft complicates arrangement in that section of a camera body. The required accurate operation of these units which control the movement of the shutter, a decisive factor in determining the performance of a camera, necessarily demands all the associated parts to be finished with extremely high precision in connection with, for example, the shape, size, thickness, engagement holes meshing with operational fulcrums and pivotal sections. Otherwise, there would possibly occur collision between said parts and other components. With the prior art single lens reflex camera, however, such important mechanisms are forcefully incorporated in a limited space with the resultant high manufacturing cost of the associated parts, eventually failing to reduce the price of the camera.

In the conventional single lens reflex camera, concentrated arrangement of various operating mechanisms only at the upper portion of the camera body limits the latitude of its shape and size, and does not admit of a large variety of design for the camera body, nor its miniaturization. Moreover, high precision finish demanded of the operating mechanism has failed to provide an inexpensive single lens reflex camera.

SUMMARY OF THE INVENTION

It is accordingly the object of this invention to provide a compact and inexpensive single lens reflex camera which eliminates the concentrated arrangement of operating mechanisms at the top of the camera body and also admits of a wide variety of design for the camera body.

The conventional single lens reflex camera consists of a plurality of operating mechanisms whose number is fixed and whose outline and position are also rigidly defined, so that the camera body has remained little changed in shape from the past, with the resultant failure to attain its miniaturization. However, close examination of the camera body has found the presence of a relatively large free space below a movable reflector, for example, a reflector box. Said space is located below that part of the camera body which is slightly apart from the center toward the side. Said part has hitherto been bored with a hole for fitting a tripod, concealing the presence of said space from view.

The present inventor has noticed the presence of said void space and also the fully separate arrangement of mechanisms for controlling the high and low operating speeds of a shutter blind expressed in seconds. Fortunately, said space below the movable reflector communicates with another space below the shutter release shaft. As naturally expected, the upper and lower parts of the release shaft are moved jointly, presenting no operational difference, whether the high speed controlling mechanism is disposed above or below said shaft. Since both high and low speed controlling mechanisms have the same coupling mechanism, placement of the high speed controlling mechanism below said winding shaft adjacent to the low speed controlling mechanism which has customarily been located in that region can eliminate the complicated coupling mechanism which has been required due to the remote position of the high speed controlling mechanism. If, therefore, the high speed controlling mechanism which has previously been received in the most crowded upper part of a camera body is shifted to said void space, then it would be quite unnecessary to render, for example, the shutter operating mechanism positioned in said crowded region extremely compact by effecting high precision work. Further, if an exposure meter previously located at the higher level of a support panel to project appreciably to the outside from the camera body is transferred, as in the present invention, to that space of the camera body from which the high speed controlling unit has been removed, then that part of the support panel will be reduced in height, rendering the camera body more compact by that extent, thereby realizing the miniaturization of a single lens reflex camera.

According to an aspect of this invention, there is provided a single lens reflex camera comprising a box-shaped camera body provided with an object lens on one side, a shutter blind so disposed in the camera body as to face the object lens, high and low speed controlling mechanisms for the shutter received in the camera body, a finder reflector located between the object lens and shutter blind, winding and rewinding shafts of the shutter blind provided on both sides of the reflector and a free space defined by the reflector, the shutter blind winding shaft and the bottom plane of the camera body, the improvement being that said high speed controlling mechanism is placed in said free space.

DETAILED DESCRIPTION OF THE INVENTION

There will now be described with reference to the appended drawings, a 35mm single lens reflex camera embodying this invention.

Figure 1:
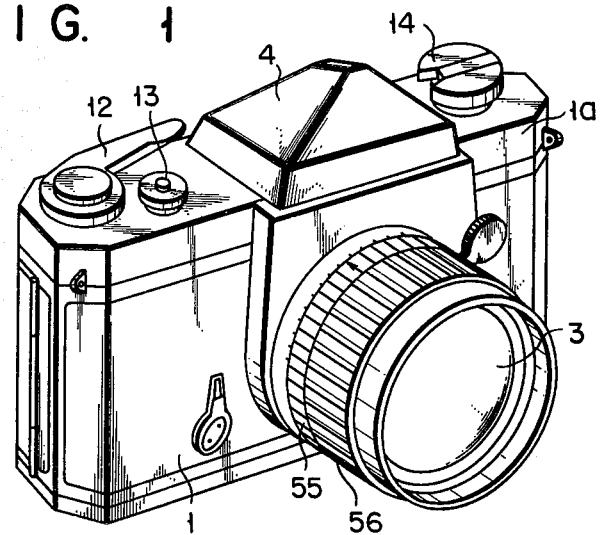
FIG. 1 is a perspective view of a single lens reflex camera embodying this invention.
Figure 2:
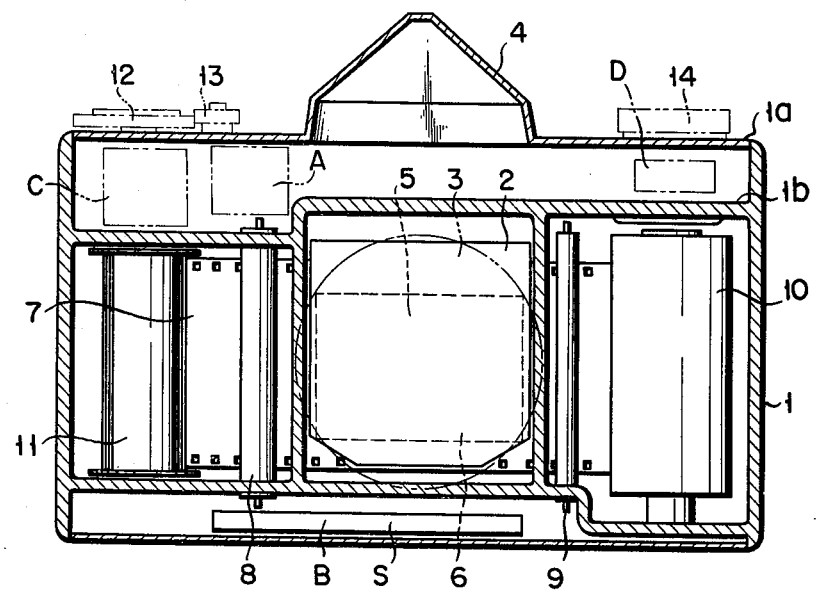
FIG. 2 schematically illustrates the interior arrangement of the camera of FIG. 1.

Referring to FIGS. 1 and 2, said single lens reflex camera has a laterally elongate box shaped body 1 containing an inclined movable reflector or a stationary semireflector 2, ahead of which there is disposed an object lens 3 and above which there is positioned a pentaprism 4. Behind said reflecting means 2 is formed an exposure window 5, behind which there is stretched a shutter blind 6. Farther behind is located that surface of a photographic film which is to be exposed to light. The shutter blind 6 is supported by a film winding shaft 8 and film rewinding shaft 9. A photographic film 7 is stretched across a patrone or cartridge 10 and a spool 11 positioned near both ends of the camera body 1, so as to be wound, as is well known, on the spool 11 from the patrone 10.

The above-mentioned arrangement is substantially the same as the known arrangment of the prior art single lens reflex camera, except for the locations of the later described shutter speed controlling mechanism and exposure meter and the construction of the former. To the top of the spool is operatively connected a film winding mechanism C, the film winding lever 12 of which is exposed to the upper surface of the decorative cap 1a of the camera top. Near the film winding lever 12 is provided a shutter button 13 which is positioned above a shutter operating mechanism (not shown). Above the patrone (cartridge) is located a film rewinding mechanism D operatively connected to said patrone. A film rewinding knob 14 is exposed to the upper surface of the decorative cap 1a.

Above the shutter release shaft 8 there has previously been disposed a high speed controlling mechanism. In the single lens reflex camera of this invention, however, an exposure meter A including an indication device is placed above said shutter release shaft 8.

As apparent from FIG. 2, the film winding mechanism C and exposure meter A are located at the lower level of a stepped support panel 1b constituting the base of the camera top and the film rewinding mechanism D is disposed at the higher level of said stepped support panel 1b.

Figure 3:
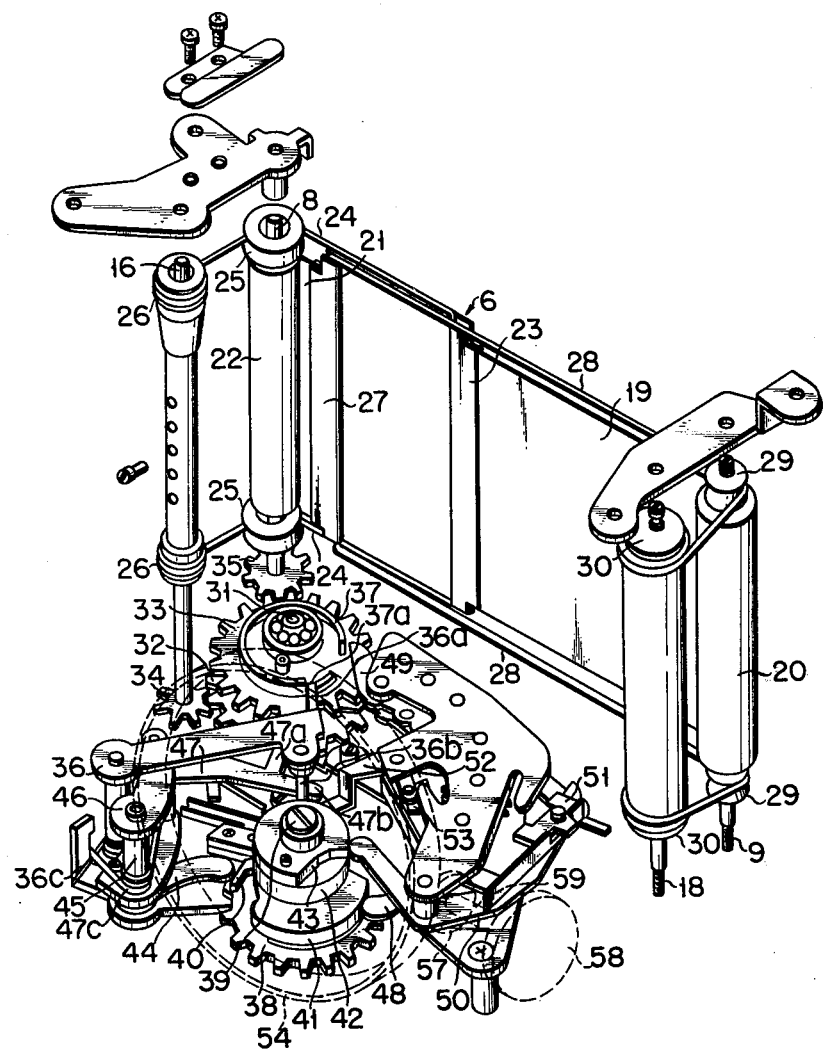
FIG. 3 is a perspective view of a mechanism for controlling the operating speed of a shutter blind included in the camera of FIGS. 1 and 2.

There will now be described with reference to FIG. 3 the support mechanism and operating speed controlling mechanism B of the shutter blind 6. On one side of the exposure window 5 are set up parallel shutter blind winding shafts 8 and 16 and on the opposite side of said window 5 are erected parallel shutter blind rewinding shafts 9 and 18. To the top of the shutter blind rewinding shaft 9 is concentrically and integrally fitted a shutter rewinding drum 20 to which there is attached the outer edge portion of a first blind 19. Similarly to the top of the shutter release shaft 8 is concentrically and integrally fitted a shutter release drum 22 to which there is attached the outer edge portion of a second blind 21. To the tail end of the first blind is fitted a blind rod 23 for defining an exposure slit. To the top and bottom ends of said blind rod 23 are fixed one end each of ribbon shaped draw members 24. The opposite ends of said ribbon shaped draw members 24 are attached to the wheels 26 fixed to the shutter release shaft 16 through a pulley 25 loosely engaging the shutter release shaft 8. To the tail end of the second blind 21 is fitted a blind rod 27 for defining an exposure slit. To the top and bottom ends of said blind rod 27 are fixed one end each of ribbon shaped draw members 28. The opposite ends of said draw members 28 are attached to a drum 30 fixed to the shutter blind rewinding shaft 18 through a pulley 29 loosely engaging the shutter blind rewinding shaft 9. The rewinding drum 20 of the first blind 19 and the rewinding drum 30 of the draw members 28 associated with the second blind 21 each contain a drive spring (not shown). Said spring is electrically charged by the release operation of a photographic film to rotate the associated drum at a prescribed time.

When the shutter blind 6 supported by the abovementioned arrangement is released, the first blind 19 first travels and after a preset time of the second order, the second blind 21 is moved as the result of said travel. Accordingly, a slit defined by the blind rods 23 and 27 of both first and second blinds 19 and 21 crosses the exposure window so as to expose the specified surface of a photographic film to light.

The foregoing description relates to the case where the shutter blind is supported by four shafts. Obviously, this invention is also applicable to a single lens reflex camera provided with a three-shaft type shutter blind constructed by replacing the two shutter release shafts 8 and 16 of the four-shaft type shutter blind by a single release shaft. In other respects, the latter type of single lens camera has the same arrangement as the former, description thereof being omitted.

The operating speed controlling mechanism B of the shutter blind 6 is positioned in a free space extending from the bottom of the shutter release shafts 8 and 16 to the bottom of a reflecting means disposed in an inclined state behind an object lens. There will now be described the arrangement and operation of said operating speed controlling mechanism B. When the film winding lever 12 rotates for winding of the film, then gears 32 and 33 engaging a shaft 31 loosely and concentrically rotate to the right interlockingly with the film release lever 12. As the result, gears 34 and 35 engaging the first mentioned gears 32 and 33 rotate to the left, causing the film release shafts 16 and 8 to rotate also to the left which are respectively fitted at the bottom with said latter gears 34 and 35. Accordingly, the draw members 24 and 28 and shutter blind 6 are pulled to the left to cause the rewinding drums 20 and 30 to be electrically charged. Thereafter, an engagement pin 36a pivotally supported at one end and projecting from the free end of the hook 36 of the second blind 21 is inserted into the notch 37a of a ring 37 concentrically mounted on the upper surface of the gear 33, thereby completing the electric charge of the rewinding drums 20 and 30.

When the later described shutter speed setting dial rotates up to the prescribed graduation on a second scale, then a gear 38 rotates which engages a crown gear 54 jointly rotatable with said shutter speed setting dial. As the result, cams 40, 41, 42 and 43 concentrically fitted to said gear 38 through a shaft 39 also rotate to the prescribed positions. Upon rotation, the high speed cam 40 has its cam surface pressed against the free end of the second blind hook 36, to cause a lever 44 pivotally supported at one end to rotate to the prescribed point, thereby defining the rotation angle of said lever 44, and in consequence that of a lever 46 connected to said lever 44 through a shaft 45. To the free end of the lever 46 is connected the rear end of a lever 47 whose forward end is separated into two prongs. Thus the rotation of the lever 44 causes the lever 47 to rotate through the prescribed angle, thereby defining the positions of two arm members 47a and 47b jointly assuming the form of a fork. The lever 47 is normally urged counterclockwise by a spring 47c, while the lever 36 is urged clockwise by a spring 36c.

When the shutter blind is released under the abovementioned arrangement, a first blind hook (not shown) interlocking with the shutter blind is disengaged therefrom to cause the first blind 19 to travel. As the result, the gear 32 commences rotation which was prevented up to this point from making any rotation by said hook. The gear 32 has an integral projection (not shown), which also rotates to push one arm member 47a of the lever 47 to the right, causing the lever 47 itself to rotate. The other arm member 47b of the lever 47 pushes to the right the pin 36b which is now brought down to the free end of the lever 36, thereby causing the lever 36 to rotate against the biasing force of the spring 36c, and disengaging the engagement pin 36a of said lever 36 from the notch 37a of the ring 37. As the result, the gear 33 rotates and in consequence the gear 35 engaged therewith also rotates to close the second blind 21. The arm member 47b of the lever 47 is brought to an angular position corresponding to the preset location of the high speed cam 40, thereby defining the sufficient amount of rotation of the gear 32 to cause its projection to push the arm member 47a. Thus after a lapse of time corresponding to said defined amount of rotation, the second blind 21 commences travelling. Namely, the point of time at which the second blind 21 begins to move is determined by the angular position of the high speed cam. Control of the operating speed of the shutter blind by said high speed cam 40 is effected when said operating speed is set at a higher rate than about 1/60 second. As used herein, the aforementioned speed controlling mechanism is referred to as "a high speed controlling mechanism."

There will now be described the operation of a low speed controlling mechanism which handles a shutter speed slower than 1/60 second. Upon the prescribed rotation of the shutter speed setting dial, the gear 38 rotates to bring the cam 41 to the prescribed angular position, causing a lever 48 abutting at one end against the cam surface of said cam 41 to rotate up to the prescribed angular position. Rotation of the lever 48 causes the sectorial gear 49 of a governor interlocking with said lever 48 to rotate up to the prescribed angular position. After rotating jointly with the gear 33, the sectorial gear 49 is pushed by the notch 37a of the ring 37 to present a changed angular position.

A lever 50 whose angular position is determined by the cam 42 controls the engagement or disengagement of a large angle 50 which acts as a brake for the governor. On the other hand, the cam 43 causes such rotation of a lever 52 as determines the engagement or disengagement of a small angle 53 so as to retard the rotation of the governor.

The shutter speed setting dial 55 (FIG. 1) coupled with the crown gear 54 engaging the gear 38 of the aforementioned speed controlling mechanism is concentrically fitted around the body 56 of an object lens. The shutter speed setting dial 55 has its peripheral wall exposed to the outside of the camera body and can set the shutter time when said periphery is manually rotated. The shutter speed setting dial 55 may be positioned in a place indicated in a broken line in FIG. 3, instead of being concentrically fitted around the lens body 56. In this case, it is only required to cause the peripheral wall of a shutter speed setting dial 58 (FIG. 3) to be exposed to the outside from the side of the lens barrel 56, using a pinion 57 engaging the crown gear 54 and a shaft 59 fitted at one end to the pinion 57 and at the other end to said shutter speed setting dial 58.

Figure 4:
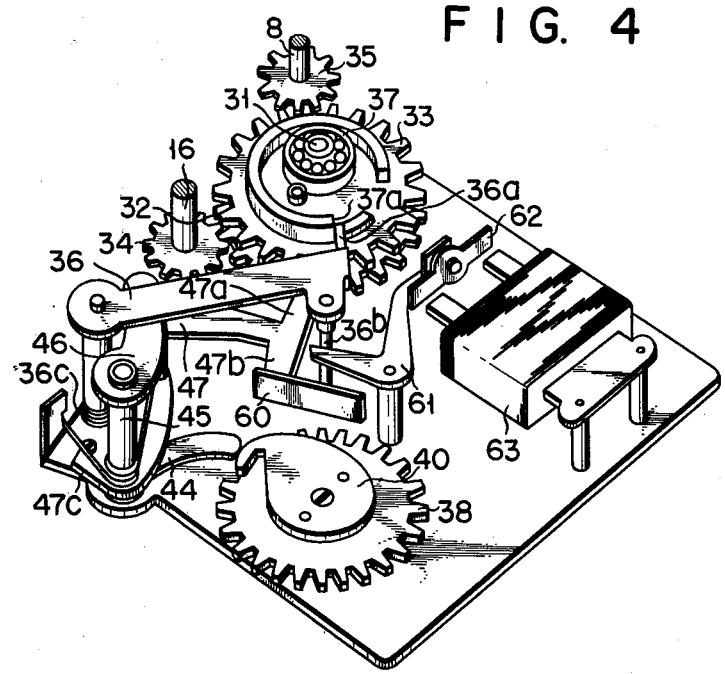
FIG. 4 is a perspective view of a modification of the operating speed controlling mechanism of FIG. 3.
Figure 5:
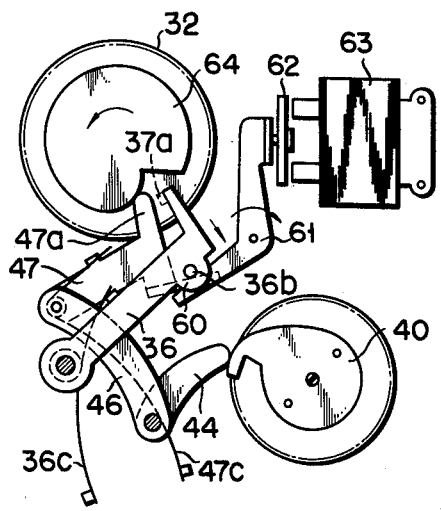
FIG. 5 is a schematic plan view of the operating speed controlling mechanism of FIG. 4.

The high and low shutter speed controlling mechanisms described above may also consist of any other type known to this particular field. For example, it is possible to provide below a reflector an electronic shutter speed controlling mechanism shown in FIGS. 4 and 5 in place of the manually operable shutter speed controlling mechanism of FIG. 3. The parts of said electronic shutter speed controlling mechanism corresponding to those of the manually operable shutter speed controlling mechanism of FIG. 3 are denoted by the same numerals, description thereof being omitted. The electronic speed controlling mechanism of FIGS. 4 and 5 has the same construction and circuit arrangement as those of a known type, description thereof being omitted. There will now be detailed the operation of a magnet associated with said electronic shutter speed controlling mechanism. Upon release of a photographic film, the electronic shutter is charged. At this time, the operating speed of said electronic shutter is set by its electric circuit whose magnet 63 is not yet excited. Upon release of the electronic shutter blind the magnet 63 is excited to cause the first blind 19 to travel. When the magnet 63 is excited, an iron strip 62 is attracted thereto, causing an L-shaped lever 61 fitted at one end with said iron strip to rotate clockwise as shown in FIG. 5 to abut against the pin 36a of the lever 36. On the other hand, a large diameter gear 32 rotates through a gear 34 simultaneously with the travel of the first blind 19. As the result, a cam 64 rotates in the direction of the indicated arrow which abuts against the arm member 47a of the lever 47 provided in place of the projection of the gear 32 used in the foregoing embodiment. Said cam 64 has such a cam surface as causes its operating periphery to have an increasing diameter. Before the shutter time is set, the large diameter operating periphery of said cam 64 pushes one arm member 47a of the lever 47, causing an upright strip 60 provided at the end of the other arm member 47b of the lever 47 to be removed from the pin 36b. However, the other end of the L-shaped lever 61 is pressed against the pin 36b to hold it, preventing the lever 36 from rotating clockwise by the urging force of the spring 36c. Namely, the engagement pin 36a of the lever 36 still remains engaged with the engagement section 37a of the large diameter gear 33, preventing said gear 33 from rotating jointly with the movement of the second blind 21. Upon lapse of the preset operating time of the electronic shutter, the magnet 63 is deenergized through the electric circuit of said shutter. As the result, the L-shaped gear 61 is now free and the lever 36 rotates clockwise by the urging force of the spring 36c. The engagement pin 36a of the lever 36 is disengaged from the engagement section 37a of the large diameter gear 33. Accordingly, the large diameter gear 33, gear 35 and shutter release shafts 8 and 16 rotate by the urging force charged up to this point, causing the second blind 21 to travel for completion of the prescribed shutter operation.

As mentioned above, the single lens reflex camera of this invention has its high speed controlling mechanism positioned in a space defined by the reflector, the shutter blind winding shafts and the bottom plane of the camera body, offering greater design latitude than the prior art single lens reflex camera in which said high speed controlling mechanism is disposed above the shutter release shafts, rendering the camera body compact and eliminating the necessity of finishing various parts with such high precision as has been required in the past. Further according to this invention, an exposure meter can be received in the space above the shutter release shafts which was occupied by the high speed controlling mechanism in the prior art single lens reflex camera, thereby enabling the present monocular reflex camera to have an outline free from the projection which might otherwise be unavoidable due to the protruding position of the exposure meter as is the case with the conventional type.

What is claimed is:

1. In a single lens reflex camera comprising a camera body provided with an object lens on one side, a shutter blind so disposed in the camera body as to face the object lens, high and low speed controlling mechanisms for the shutter blind, a reflex mirror located between the object lens and the shutter blind, winding and rewinding shafts of the shutter blind provided on both sides of the reflex mirror and a space defined by the reflex mirror, the shutter blind winding shaft and the bottom plane of the camera body, the improvement being that said high speed controlling mechanism is placed in said space.

2. In a single lens reflex camera comprising a camera body having a top, bottom, front, back and two sides, an object lens on the front of the camera body, first and second shutter blinds positioned in the camera body between the object lens and the back of said camera body, high and low speed shutter controlling mechanisms received in the camera body; actuating means for said high and low speed shutter controlling mechanisms; a reflex mirror located between the object lens and the shutter blinds, a shutter blind winding shaft positioned between the reflex mirror and one side of the camera body, a shutter blind rewinding shaft positioned between the reflex mirror and the other side of the camera body; the improvement comprising at least a portion of said high speed shutter controlling mechanism being located between the bottom of the camera body and the lower edge of the reflex mirror and controlling the movement of the second shutter blind during travel of the first shutter blind.

3. The single lens reflex camera of claim 2 further comprising a lens barrel within which said object lens is mounted, said lens barrel having a peripheral wall and being fitted to the front of the camera body and extending outwardly therefrom and a movable shutter dial mounted around the base of the peripheral wall of the lens barrel, said shutter dial being operatively connected to said high and low speed shutter controlling mechanisms.

4. The single reflex camera according to claim 2 wherein the actuating means for the high speed shutter controlling mechanism of the shutter blind includes an electro-magnet having an energization state the duration of which is a function of a preset shutter speed.

5. The single lens reflex camera according to claim 2 wherein at least a member of the high speed shutter controlling mechanism, which permits the second shutter blind to start for determining the time, is mounted under the mirror.

6. In a single lens reflex camera comprising a camera body having a top, bottom, front, back and two sides, an object lens on the front of the camera body, first and second shutter blinds positioned in the camera body between the object lens and the back of said camera body, a high speed shutter controlling mechanism positioned in said camera body for controlling the timing of when the second shutter blind starts running before the first shutter blind stops running, a low speed shutter controlling mechanism positioned in said camera body for controlling the timing of when the second shutter blind starts running after the first shutter blind stops running, actuating means for said high and low speed shutter controlling mechanisms; a reflex mirror located between the object lens and the shutter blinds, a shutter blind winding shaft positioned between the reflex mirror and one side of the camera body, a shutter blind rewinding shaft positioned between the reflex mirror and the other side of the camera body; the improvement comprising at least a portion of said high speed shutter controlling mechanism being located in said camera body between the bottom of the camera body and the lower edge of the reflex mirror.

7. The single lens reflex camera of claim 6 further comprising said at least a portion of the high speed shutter controlling mechanism including a gear train.

8. In a single lens reflex camera comprising a camera body having a top, bottom, front, back and two sides, an object lens on the front of the camera body, first and second shutter blinds positioned in the camera body between the object lens and the back of said camera body, high and low speed shutter controlling mechanisms received in the camera body, actuating means for said high and low speed shutter controlling mechanisms; a reflex mirror located between the object lens and the shutter blinds, a shutter blind winding shaft positioned between the reflex mirror and one side of the camera body, a shutter blind rewinding shaft positioned between the reflex mirror and the other side of the camera body, the improvement comprising: at least a portion of said high speed shutter controlling mechanism being located between the bottom of the camera body and the lower edge of the reflex mirror and controlling the movement of the second shutter blind during travel of the first shutter blind; and, an exposure meter means located in a space within the camera body defined by the top of said camera body and the upper end of said shutter winding shaft.

9. The single lens reflex camera of claim 8 further comprising a lens barrel within which said object lens is mounted, said lens barrel having a peripheral wall and being fitted to the front of the camera body and extending outwardly therefrom and a moveable shutter dial mounted around the base of the peripheral wall of the lens barrel, said shutter dial being operatively connected to said high and low speed shutter controlling mechanisms.

10. The single lens reflex camera according to claim 8, wherein the actuating means for the high speed shutter controlling mechanism of the shutter blind includes an electromagnet having an energization state the duration of which is a function of a preset shutter speed.

11. The single lens reflex camera according to claim 8, wherein at least a member of the high speed shutter controlling mechanism, which permits the second shutter blind to start for determining the shutter exposure time, is mounted under the mirror.

12. In a single lens reflex camera comprising a camera body having a top, bottom, front, back and two sides, an object lens on the front of the camera body, first and second shutter blinds positioned in the camera body between the object lens and the back of said camera body, a high speed shutter controlling mechanism positioned in said camera body for controlling the timing of when the second shutter blind starts running before the first shutter blind stops running, a low speed shutter controlling mechanism positioned in said camera body for controlling the timing of when the second shutter blind starts running after the first shutter blind stops running, actuating means for said high and low speed shutter controlling mechanisms; a reflex mirror located between the object lens and the shutter blinds, a shutter blind winding shaft positioned between the reflex mirror and one side of the camera body, a shutter blind rewinding shaft positioned between the reflex mirror and the other side of the camera body, the improvement comprising: at least a portion of said high speed shutter controlling mechanism being located in said camera body between the bottom of the camera body and the lower edge of the reflex mirror; and, an exposure meter means located in a space within the camera body defined by the top of said camera body and the upper end of said shutter winding shaft.

13. The single lens reflex camera of claim 12 further comprising said at least a portion of the high speed shutter controlling mechanism including a gear train.

14. In a single lens reflex camera comprising a camera body having a top, bottom, front, back and two sides, an object lens on the front of the camera body, first and second shutter blinds positioned in the camera body between the object lens and the back of said camera body, high and low speed shutter controlling mechanisms received in the camera body, actuating means for said high and low speed shutter controlling mechanisms; a reflex mirror located between the object lens and the shutter blinds, a shutter blind winding shaft positioned between the reflex mirror and one side of the camera body, a shutter blind rewinding shaft positioned between the reflex mirror and the other side of the camera body, the improvement comprising: at least a portion of said high speed shutter controlling mechanism being located between the bottom of the camera body and the lower edge of the reflex mirror and controlling the movement of the second shutter blind during travel of the first shutter blind; and, at least a portion of said low speed shutter controlling mechanism being located between the bottom of the camera body and the lower edge of the reflex mirror.

15. The single lens reflex camera of claim 14 further comprising a lens barrel within which said object lens is mounted, said lens barrel having a peripheral wall and being fitted to the front of the camera body and extending outwardly therefrom and a moveable shutter dial mounted around the base of the peripheral wall of the lens barrel, said shutter dial being operatively connected to said high and low speed shutter controlling mechanisms.

16. The single lens reflex camera of claim 14 further comprising an exposure meter means located in a space within the camera body defined by the top of said camera body and the upper end of said shutter winding shaft.

17. The single lens reflex camera according to claim 14, wherein the actuating means for the high speed shutter controlling mechanism of the shutter blind includes an electromagnet having an energization state, the duration of which is a function of a preset shutter speed.

18. The single lens reflex camera according to claim 14, wherein at least a member of the high speed shutter controlling mechanism, which permits the second shutter blind to start for determining the shutter exposure time, is mounted under the mirror.

19. In a single lens reflex camera comprising a camera body having a top, bottom, front, back and two sides, an object lens on the front of the camera body, first and second shutter blinds positioned in the camera body between the object lens and the back of said camera body, a high speed shutter controlling mechanism positioned in said camera body for controlling the timing of when the second shutter blind starts running before the first shutter blind stops running, a low speed shutter controlling mechanism positioned in said camera body for controlling the timing of when the second shutter blind starts running after the first shutter blind stops running, actuating means for said high and low speed shutter controlling mechanisms, a reflex mirror located between the object lens and the shutter blinds, a shutter blind winding shaft positioned between the reflex mirror and one side of the camera body, a shutter blind rewinding shaft positioned between the reflex mirror and the other side of the camera body, the improvement comprising at least a portion of both of said high and low speed shutter controlling mechanisms being located in said camera body between the bottom of the camera body and the lower edge of the reflex mirror.

20. The single lens reflex camera of claim 19, further comprising said at least a portion of the high speed shutter controlling mechanism including a gear train.

* * * * *